March 7, 1961     H. H. GREGER     2,973,568
APPARATUS FOR FAST-FIRING CERAMIC WARE
Filed Sept. 5, 1958     2 Sheets-Sheet 1

INVENTOR
HERBERT H. GREGER
BY John Gibson Semmes
ATTORNEY

March 7, 1961 H. H. GREGER 2,973,568
APPARATUS FOR FAST-FIRING CERAMIC WARE
Filed Sept. 5, 1958 2 Sheets-Sheet 2

INVENTOR
HERBERT H. GREGER
BY John Gibson Semmes
ATTORNEY

United States Patent Office 2,973,568
Patented Mar. 7, 1961

2,973,568

APPARATUS FOR FAST-FIRING CERAMIC WARE

Herbert Hans Greger, Glen Road, Rockville, Md.

Filed Sept. 5, 1958, Ser. No. 759,307

6 Claims. (Cl. 25—132)

This invention relates to the firing of ceramic material and more particularly has reference to an apparatus for fast-firing ceramic ware such as tile.

In recent years there has developed among ceramic engineers a school of thought which advocates faster firing schedules for ceramic materials. This faster firing is, in some cases, possible as new and improved ceramic setter materials and shapes have become available, which setter materials have a sufficiently longer life to enable use economically at the faster rates of firing. In many instances, the ceramic material or ware itself is capable of permitting several times the rate of firing that is presently used, but in order to strike an economic balance between production of saleable ware and replacement cost for setters, the firing schedule has been adjusted to the optimum cycle. The longer this cycle, the larger is usually the cross section and the length of the kiln and the more ware it will hold, but also the initial investment and maintenance costs will be larger the larger is the kiln. Conversely, the faster the firing schedule, the smaller can be the cross section and length of the kiln and the lower may be initial investment and maintenance costs. Notwithstanding the differences in initial costs, the life of a large conventional kiln and of a small fast-fire kiln constructed according to this invention, may be the same. Additionally, in the fast-firing of ceramic tile great economies in the use of stain have been achieved. One-half of one percent of stain or less, instead of five percent of stain being required in many instances where translucency develops as a result of the fast firing.

The principal object of this invention is to provide an apparatus for fast-firing ceramic material and ware which will overcome the disadvantages of firing apparatus heretofore employed.

Another object of this invention is to eliminate entirely the necessity for use of setters in apparatus for the firing of ceramic ware.

Still another object of this invention is to provide an apparatus for the firing of ceramic ware while said ware is supported on a bed of sand or other granular refractory material.

A further object of this invention is to replace the usual solid refractory hearth in a ceramic firing kiln by a bed of sand or other granular refractory material.

Yet another object of this invention is to substitute rigid brickwork in the movable member of a kiln by a bed of sand or other granular refractory material.

A still further object of this invention is to provide a bed of granular refractory material in a firing kiln not only for carrying the ceramic ware to be fired but also as a source of granular particles for fusion to the ware providing same with a rough surface.

It is also an object of this invention to provide a kiln having a refractory hood mounted over a movable bed of granular material and provided with skirt-like elements depending from the sides of the hood and penetrating into the bed of granular material to provide a seal between the hood and the body of granular material.

With these and other objects in view which will appear from the following description, the invention resides in a kiln for fast-firing ceramic material, and the parts and combinations thereof.

Figure 3:
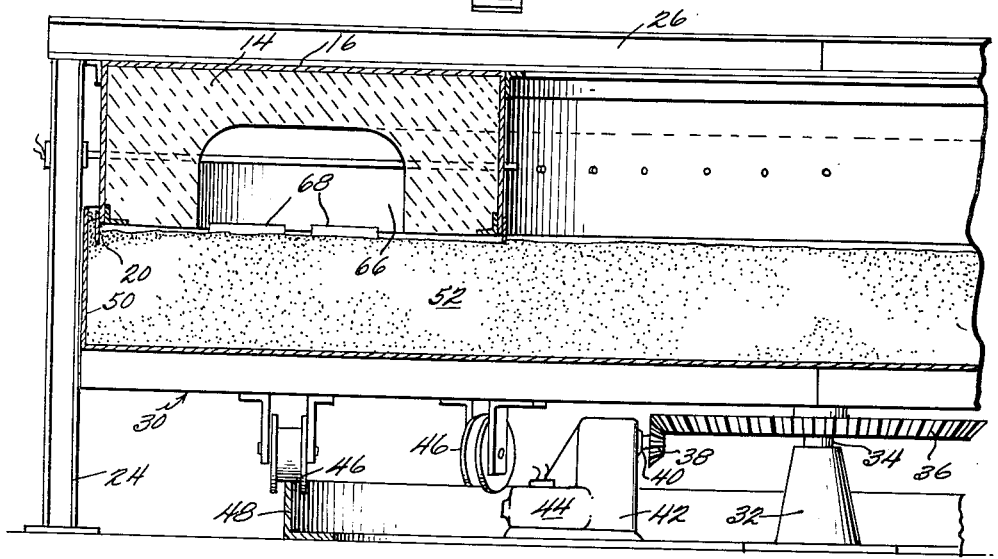
Figure 3 is a fragmentary vertical sectional view of the invention taken on line 3—3 of Figure 1.
Figure 2:
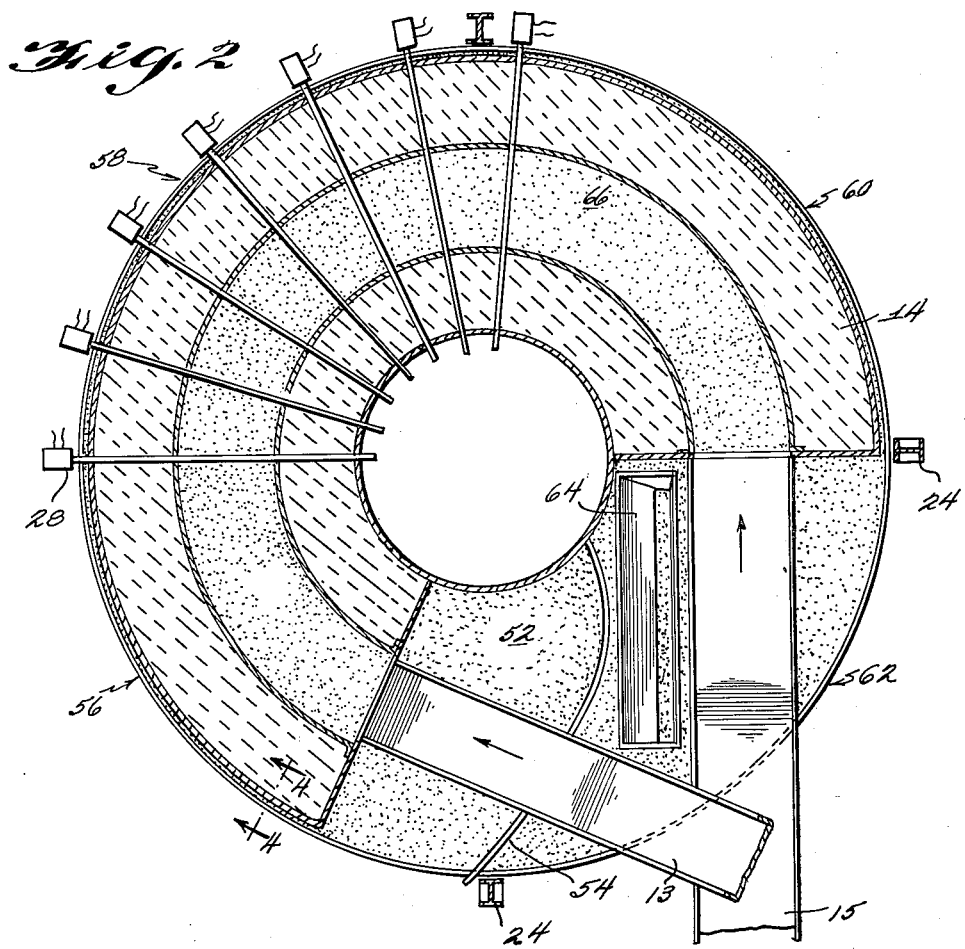
Figure 2 is a transverse sectional view taken on line 2—2 of Figure 1.

Referring to the drawings, a kiln 10 particularly suitable for carrying out the present invention comprises a substantially annular hood or muffle 12 of inverted U-shaped cross section. The hood is fabricated of refractory heat-insulating material 14 encased in a shell 16 of sheet steel or other suitable material. (See Figure 2.) The shell 16 extends about the upper and outer side walls of the hood and extends partially beneath the bottom surfaces of hood 12 in the form of annular members 18 of angular cross section. As shown in Figures 2 and 3, skirts 20 of shell 16 are attached to shell annular members 18. These skirts protrude into a granular refractory bed 52.

Figure 1:
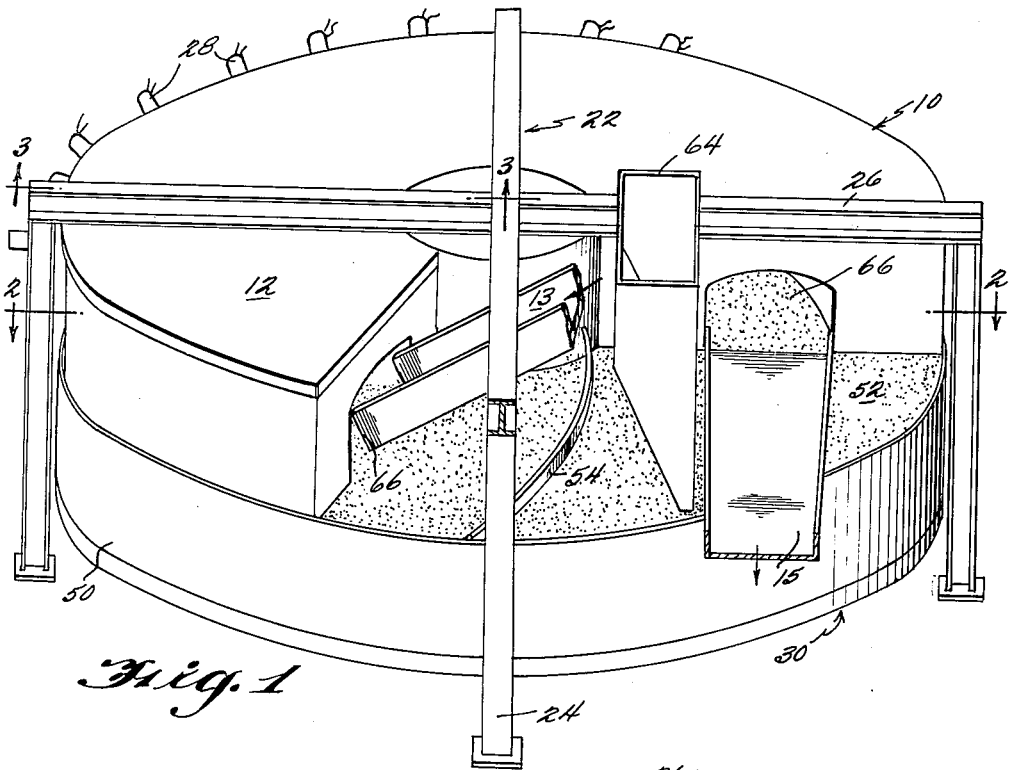
Figure 1 is a perspective view of a firing kiln constructed according to the present invention.

As clearly shown in Figure 1, the hood 12 is supported through its shell by a framework 22 consisting of a plurality of columns 24 disposed about the annular kiln and supporting a plurality of beams 26. With this construction annular kiln 10 is suspended from the framework 22. Charging of ceramics, such as tiles 68, is by means of conveyor chute 13 extending into the charging end of an annular firing chamber 66. Discharge of ceramics 68 is by means of downwardly inclined baffle discharge chute 15, the friction between the ceramics and revolving sand bed 52 causing the latter to force the tiles onto chute 15.

The refractory portion of hood 12 is so profiled on its underside as to provide annular firing chamber 66 through which ware to be fired is carried. This annular firing chamber or muffle is surrounded by refractory material 14 which confines the heat that causes the ware to be matured. The refractory also carries burners or electric heating elements 28, the latter being made either of resistance wire or of silicon carbide bars or the like. See Figures 2 and 3. In the event that gas burners (not illustrated) are employed as heating elements burner ports could be cut in staggered relationship through the sides of hood 12 and gas escape vents could be provided at the top of the hood.

The refractory annular hood 12 may be built of insulating brick or of an insulating light-weight castable. Such a castable could be cast in one piece in place or in section blocks using suitable molds. The blocks thus produced are placed into shell 16 and, if accurate enough in dimension, may not require cementing. By providing a groove 1 to 2 inches deep in the outer parts of the seams between blocks, a tight packing of asbestos may be provided for closing same. This conventional feature is not illustrated. This construction will provide the necessary free movement for heat expansion and for minimizing cracking on account of it. Various castable refractory mixes for the blocks are available commercially which contain insulating grog or other insulating materials, such as hollow alumina spheres, and it is desirable to use such substitutes.

Positioned beneath annular hood 12 is a turntable 30. See Figure 3. While various constructions may be employed for the turntable, for purposes of the present invention turntable 30 is provided with a central supporting base or pedestal 32, which is positioned on the floor footing or other supporting surface. Turntable 30 is keyed to spindle 34. Spindle 34 rotatably bears in pedestal 32. Spindle 34 carries large gear 36 which is driven by a pinion 38 mounted on the output shaft 40 of a speed-reducing mechanism 42. The mechanism 42 is driven by an electric motor or other suitable source of power 44.

To reduce the load carried by spindle 34, turntable 30 is provided with a plurality of wheels 46. Wheels 46 are adapted to roll over circular endless track 48 positioned on the floor or other supporting surface. The wheels 46, by means of suitable axles, are rotatable in forks on the underside of the turntable and are suitably distributed around the bottom of turntable 30.

Turntable 30 supports a pan 50 formed of steel or other suitable material. In pan 50 a bed 52 of granular material of a refractory characteristic such as sand is deposited. Bed 52 of sand or other suitable granular refractory material is of a depth substantially equal to the depth of the pan 50. It will be noted that turntable 30 is a means of supporting the bed of "sand" 52 and imparting to it rotary motion for the purpose of moving supported articles through the firing tunnel 24 in hood 12 of the kiln.

While pan 50 has been indicated in Figures 1 and 2 as being entirely filled with bed 52 of granular material, it is within the concept of the present invention to make the pan 50 of annular formation with respect to hood 12. This bed of granular material is of a circumference slightly greater than the circumference of hood 12. As an example, the granular bed 52 shown in Figure 2 may be contained by a pan of 9 feet in diameter and 12 inches in depth. This circular pan or trough is filled with a granular material, such as bedding sand as is conventionally used in dinnerware fabrication and firing.

There is no particular restriction as to the nature of this granular material and its mesh size. For example, the "sand" or granular material may be quartz, calcined clay grog, alumina, mullite, kyanite, aplite, zircon, zirconia, magnesia, and others. The size may vary between 14 to 60 mesh for example. The composition and the size have to be chosen, however, in a manner that the bed of sand or other granular material remains free flowing. Essentially no sintering is permitted under the temperature conditions in the kiln, insuring that profiling or leveling operations of the bed surface may be conducted at all times without interference. Such leveling operations are carried out automatically by a scraper 54, attached to the core of annular hood 12. In lieu of scraper 54 rolls or similar devices, positioned at suitable points in the path of travel of the bed, might be employed. Arcuate scraper 54 is shown in Figures 1 and 2.

The choice of the sand or granular material of the bed depends on the top temperature of the firing cycle and the interaction between the sand or granular material and the ware supported thereon. To explain, the two factors are to some extent interrelated as increasing temperatures will promote chemical reaction. The maturing range of a ceramic composition must be determined by tests. For example, if full density is desired, tests will indicate ranges between the lowest temperature at which this density develops and the temperature where overfiring occurs, as shown by bloating, distortion, mechanical weakness, or even fusion of the edges. During these tests, several different sands or granular materials may be tested for purposes of the bed. A good idea as to just what composition a sand or other granular material should have may be ascertained quite readily, since those skilled in the art have knowledge of the desired setting material for most ceramic compositions.

The tendency of a ceramic body to mature during kiln firing depends not only on its composition, but also on the fineness of particle size in the ceramic body and the proximity of the particles to each other. If the particles are small, say 0.5 to 10 microns, and closely packed, they begin to interact, recrystallize, and grow at temperatures far below the sintering range of a coarser composition, and strength of the ceramic body develops readily. However, if the packing is loose and the particles are large, such as they would be in a supporting bed according to this invention, only some light cohesion of such coarse particles might develop. Such cohesion is readily destroyed. This means that sand or other granular refractory material in the bed can be used over a fairly wide range of temperature. Precise ranges can hardly be given, but temperature and chemical reaction with the ware causing formation of a low-fusing slag are the most important criteria for the choice.

Silica sand with soft and hard porcelain may be used at temperatures up to cone 13 or up to about 1350° C. A similar limit of temperature may apply to kaolin grog corresponding to a #1 fire brick, kyanite or zircon. Sintered alumina, mullite, magnesia, and zirconia may be used at temperatures up to 1550° C. under precautions previously outlined, or even higher if the kiln is built for it.

If for some reason slagging problems in the refractory bed still exist, such as is the case with some rare earth compositions, then a special parting material may be interposed between bed sand and ware. A precious metal foil, such as platinum, or even a thin zirconium oxide setter plate, can be used for such purposes.

*Chart I*

The following are examples of ceramic compositions that may be fired according to the present invention:

| Ceramic | Composition | Approximate Maturing Temperature |
| --- | --- | --- |
| 1. Porcelain | Clay, 30-40%; Spar, 40-50%; Flint, 30-10%. | Cone 8-12, 1260-1335° C. |
| 2. Clay Body | Crude or Refined Natural Clay, 100-60%. | Cone 01-10, 1145-1305° C. |
| 3. Grog Body | Grog, 50-80%; Clay, 50-10%. | Cone 1-12, 1160-1335° C. |
| 4. Refractory Bodies, #1 Clays. | Grog 50%; Clay 50% | up to Cone 20; up to 1530° C. |

From reference to Figure 2 it will be noted that the refractory hood or muffle 12 is divided into four principal zones, the charging and discharging zone 62, the preheating zone 56, the firing zone 58, and the cooling zone 60. The charging and discharging zone 62 is kept relatively small in order to provide as much space as possible for the firing operation. However, the charging and discharging zone 62 must be adequate also for introducing the sand through hopper 64 and leveling the bed surface between charging and discharging.

The preheating and cooling zones 56 and 60 respectively are essentially similar in profile and construction unless either fast cooling is required or less of the insulating refractory need be provided in the cooling zone. On the other hand, additional cooling may be provided for outside of refractory hood 12. Additional preheating may be gained within the space provided by mounting a fan (not illustrated) at the discharge end of annular hood 12, said fan blowing heated air toward the charging end and into pre-heating zone 56. The firing zone 58 may have gas burner ports either on the side of the muffle 12 or on its top. Corresponding gas vents for the waste gases are provided, for example, through the top if the burners are placed on the sides. When electric heating elements are used, they are placed through oversize holes in the sides of the hood near the top of the muffle. The firing zone may occupy, for example, about one-third or more of the muffle length.

Figure 4:
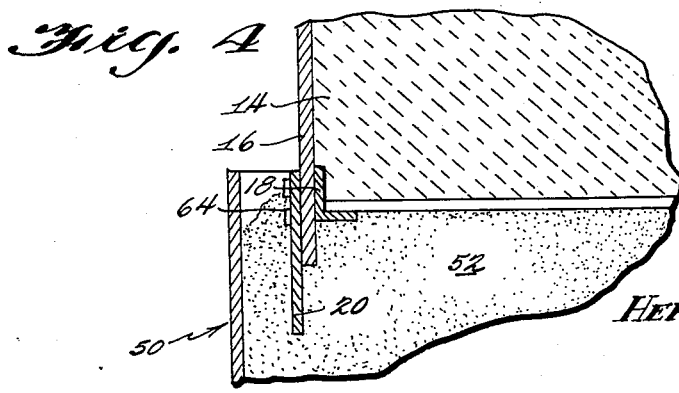
Figure 4 is an enlarged vertical sectional view, partially in fragment, taken on line 4—4 of Figure 3.

A narrow space is provided between the bottom of the hood refractory and the upper surface of the sand bed. In order to close this gap, skirts 20 are provided which enter sand bed 52 and form a seal. These skirts are attached to the muffle shell 16 and its inner annular member 18. Skirt plows (not illustrated) may be employed to urge a marginal flange 64 of sand about skirt 20. See Figure 4, in this connection.

While it is important to have the hood and the sand bed in accurate position with respect to each other, this accuracy of positioning is not nearly as important here as it would be if the sand were replaced by rigid refractory material. Accuracy of tolerance then required would be far beyond normal construction and operating techniques and would be considerably more costly. Free sand cannot readily jam, it is capable of movement upon either heat expansion, cracking of the refractory or other causes, such as jamming of the ware. It is one of the important functions of the sand bed to "give" or deform and to help adjust to such abnormal conditions of operation. It is also an important function of the sand bed to provide easy access to the interior of the kiln for repairs.

The kiln may be built for the manufacture of tile, dinnerware and other ware capable of being fired rapidly. The characteristics of the sand will, of course, have to be somewhat adjusted to the specific use. In most cases, for example, it will be necessary to select the bed sand for abrasion resistance, besides refractoriness, spalling resistance, and resistance to thermochemical reaction with the ware. In some instances, it may be desirable to cause adhesion by fusion of bed sand to the underside of the tile to provide a rough bottom surface for cementing the tile to a wall. In such instances, the tile may consist of translucent porcelain which upon heating becomes soft enough to fuse to the sand. Tests have shown that such a tile body when it softens becomes completely level and conforms substantially to the level surface of the sand bed.

By the proper choice of refractory sand and the body of the ware, a large variety of fast-fire operations can be carried out. If a necessity arises, the sand bed may be changed freely and without large expense. Also cleaning of the sand bed by screening or washing may occasionally be necessary. For better heat insulation, the lower portion of the pan may be filled with such high quality insulating materials as diatomite blocks or the like. In order to compensate for expansion deviation in the pan carriage rollers 46 may be widened.

The successful fast-fire operation according to this invention depends primarily on heating and cooling of the ware without involving a large amount of rigid refractory material in the form of setters, kiln walls, and kiln car tops. Rigid refractory materials, on the other hand, and during frequent heating and cooling, fatigue readily, crack, and spall. Also the less the mass which has to be heated, the lower is the fuel cost as in practice of the instant invention. The only large refractory shapes are in the annular hood where they stay at relatively constant temperature and are not subject to rapid heating and cooling which accompany cracking and spalling. Only when the kiln is placed into or out of operation does heating and cooling take place. In beginning or stopping operation rates of temperature change are relatively slow and readily controlled.

Successful fast-firing according to this invention also requires heating the pieces of ware almost individually, such as is possible in a single layer, and on a bed of sand. Such individual heating is largely the purpose of the rotating sand bed kiln. The sand bed is not subject to cracking and spalling, it is a good and cheap heat insulator, and when a circular motion is arranged, it is a good conveyor.

The furnace of this invention contemplates the use of temperatures where steel or other metal will be rapidly destroyed (i.e. in excess of 950° C., maximum for Ni-Cr alloy). All metal parts in this invention, it will be noted, are located outside the heating zone and are protected by insulation and cooled by air. They will not thus be subject to destruction. Having described my invention, I claim:

1. A kiln for fast firing ceramic ware at high temperature comprising an upright framework, an annular muffle mounted in said framework and having downwardly extending skirts, a heat shock free kiln floor composed of a shell filled substantially with a homogeneous 14 to 60 mesh granular, free-flowing refractory material being essentially free from sintering at temperatures in excess of 950° centigrade, said kiln floor being rotatably mounted with respect to said muffle so that said skirts of said muffle protrude into said floor, and means for moving the floor relatively to said muffle to advance ceramic material supported on said floor through said muffle.

2. A kiln as in claim 1, said granular refractory material being mullite.

3. A kiln as in claim 1, said granular refractory material being alumina.

4. A kiln as in claim 1, said granular refractory material being zirconia.

5. A kiln as in claim 1, said granular refractory material being magnesia.

6. A kiln for fast firing ceramic ware at high temperature comprising an upright framework, an annular muffle mounted in said framework and having downwardly extending skirts, a heat shock free kiln floor composed of a shell filled substantially with a homogeneous 14 to 60 mesh granular, free-flowing refractory material being essentially free from sintering at temperatures in excess of 950° centigrade, said kiln floor being rotatably mounted with respect to said muffle so that said skirts of said muffle protrude into said floor, means for moving the floor relatively to said muffle to advance ceramic material supported on said floor through said muffle, and means supported in said framework for adjusting the level of said granular refractory material and for replenishing said granular refractory material.

References Cited in the file of this patent

UNITED STATES PATENTS

| | | |
|---|---|---|
| 906,416 | Harkins | Dec. 8, 1908 |
| 1,881,683 | Knapp | Oct. 11, 1932 |
| 2,188,608 | Littleton et al. | Jan. 30, 1940 |

FOREIGN PATENTS

| | | |
|---|---|---|
| 45,706 | Denmark | May 11, 1932 |
| 740,254 | Germany | Oct. 15, 1943 |